Sept. 5, 1944.　　　W. M. BOULAIS　　　2,357,308
NETTED FABRIC MACHINE
Filed May 12, 1943　　　5 Sheets-Sheet 2

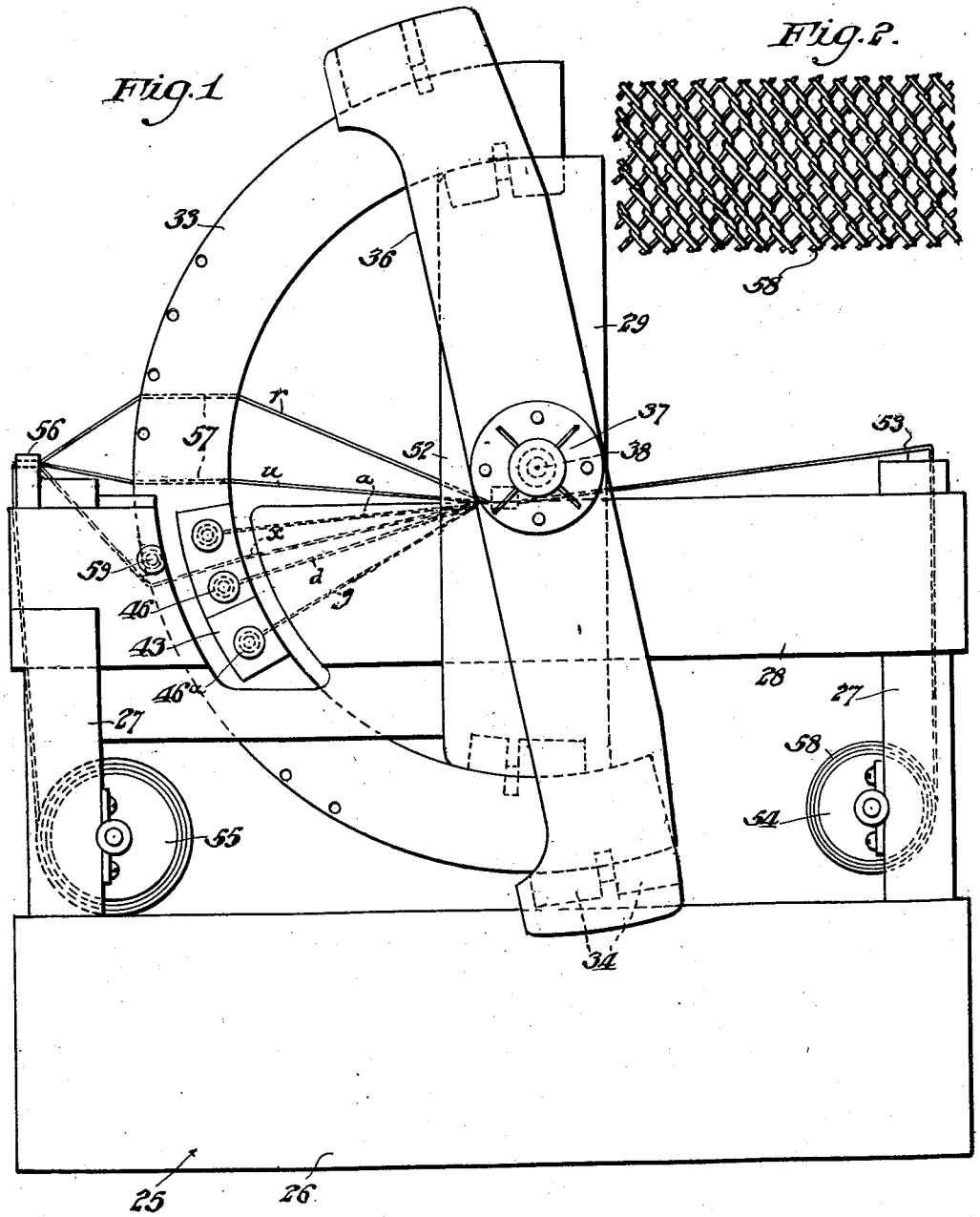

Inventor:
Wilfrid M. Boulais,
By W. B. Williamson
Attorney.

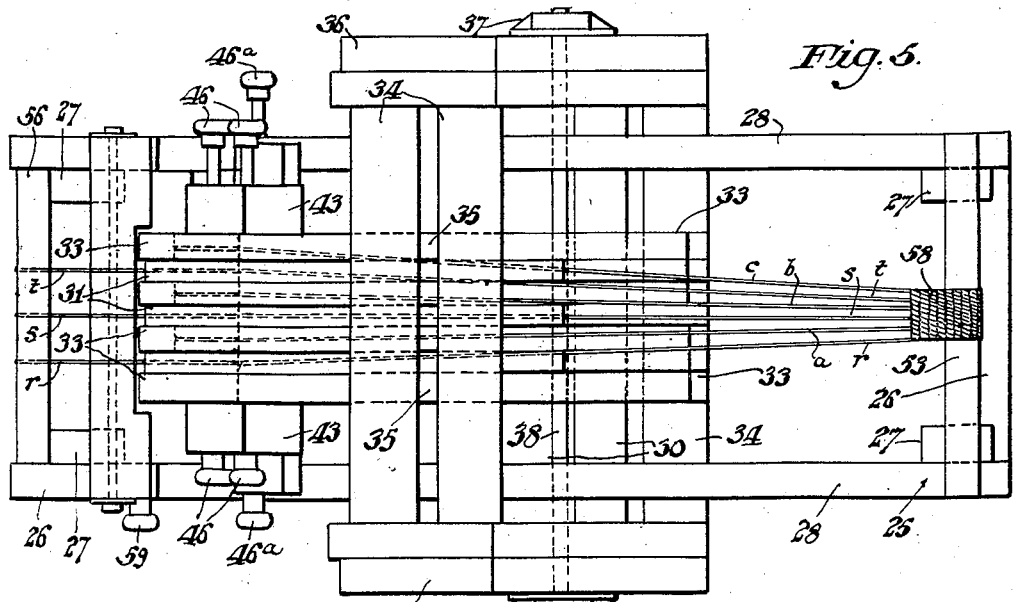

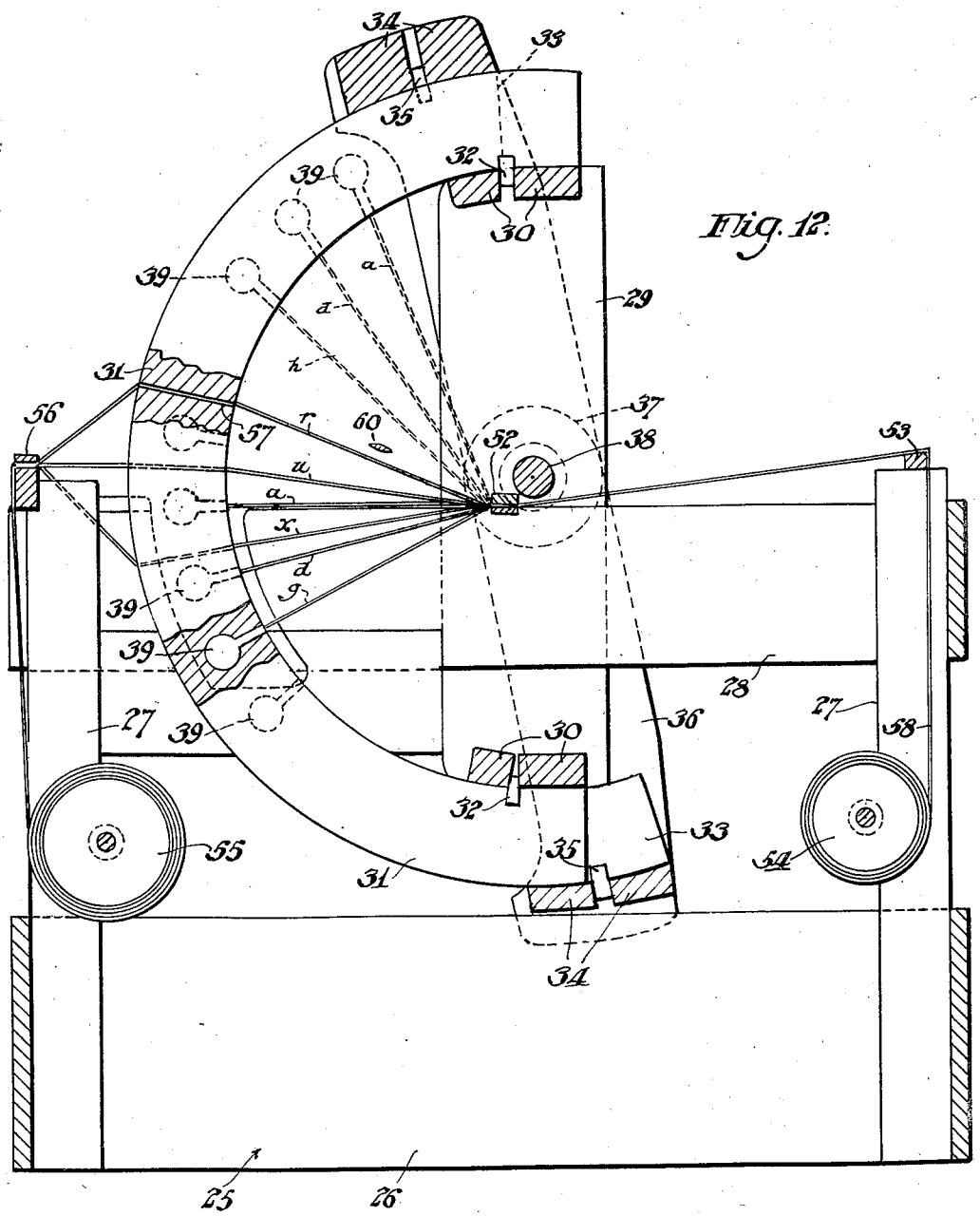

Sept. 5, 1944. W. M. BOULAIS 2,357,308
NETTED FABRIC MACHINE
Filed May 12, 1943  5 Sheets-Sheet 5
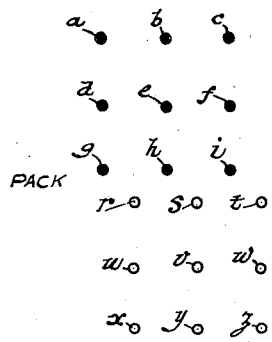
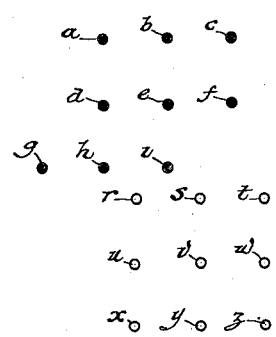
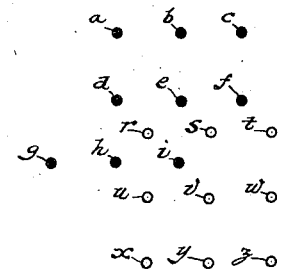
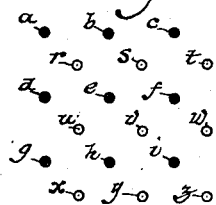
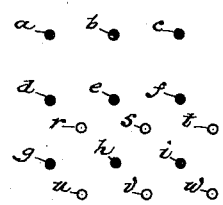
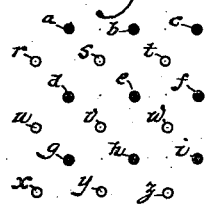
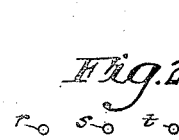
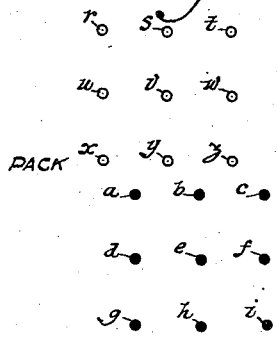
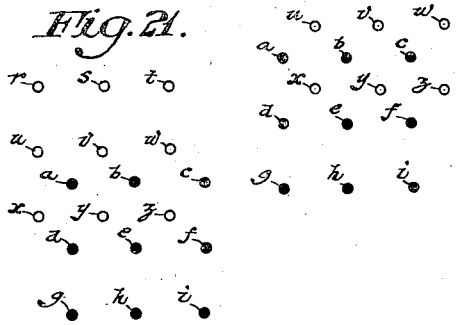
Inventor:
Wilfrid M. Boulais,
By W. W. Williamson
Attorney.

Patented Sept. 5, 1944

2,357,308

UNITED STATES PATENT OFFICE 2,357,308

NETTED FABRIC MACHINE

Wilfrid M. Boulais, Upper Darby, Pa., assignor to Boulais Machine Company, Upper Darby, Pa., a corporation of Pennsylvania Application May 12, 1943, Serial No. 486,925

11 Claims. (Cl. 87—24)

My invention relates to a new and useful netted fabric machine, and has for one of its objects to construct such a machine having a unique method of operation.

Another object of the invention is to provide a netted fabric machine that permits a greater number of threads to be employed in each square inch of fabric produced whereby a close mesh fabric may be manufactured.

Another object of this invention is to construct a machine of the character mentioned wherein the warp and spool threads are arranged in vertical groups and horizontal rows to provide for the employment of a multiplicity of individual threads occupying a relatively small space so that the machine is compact and requires a very limited amount of floor space.

The device illustrated in drawings is operated manually in its entirety and can be used for experimenting with and producing and charting new types or designs of fabrics that subsequently will be made on a fully automatic, power driven machine embodying the principles and elements herein disclosed.

Prior machines for making twisted thread fabrics have been limited in their uses to the production of wide open mesh fabrics where uniformity of size, shape and structure was not plainly visible or important, such as in the manufacture of lace, for example, but in contradistinction thereto my machine permits the production of exceedingly compact, close and uniform fabrics having almost unlimited uses.

Another object of my invention is to provide a netted fabric machine having a plurality of rows of spools carried in arcuate slides, instead of the usual single row of thread holders in a straight bar, in order to provide a greater number of spool threads all extending in radial lines to a common center.

Another object of this invention is to provide a machine of the character mentioned having arcuate guides for the slides and through which warp threads are passed and arranged in a plurality of uniform rows and extending in radial lines from the guides to a common center.

A further object of the present invention is to provide a machine of the character mentioned wherein the spool threads are moved transversely in preselected steps and in various orders and also in a circular generally vertical direction to take all of the spool threads completely out of the field of the warp threads for packing purposes and to produce a predesigned netted fabric.

A still further object of the invention is to provide a netted fabric machine having means for manipulating the rows and the entire group of spools to change the positions of the spool threads relative to the warp threads and thereby form stitches, loops or meshes in accordance with the fabric being made, and to intermesh each group of warp threads with contiguous groups of spool threads whereby all groups will be joined in one unitary fabric.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawings forming a part hereof, in which:

Fig. 1 is a side elevation of a manually operated netted fabric machine embodying my invention.

Fig. 2 is a face view of a piece of fabric that can be made on this machine.

Fig. 5 is a top plan view of the machine.

Fig. 6 is an enlarged cross sectional view through the slides, guides and magazines illustrating one position of one row of spool casings or holders.

Figs. 7 and 8 are diagrammatic views of the two opposite final movements of the spool threads for positioning the threads just prior to packing to complete the twisting operations.

Figs. 9, 10 and 11 are diagrammatic views of the group stitches and how the groups are joined to produce a fabric.

Fig. 12 is a vertical end to end sectional view of the machine with portions broken away to show details of construction.

Figure 3:
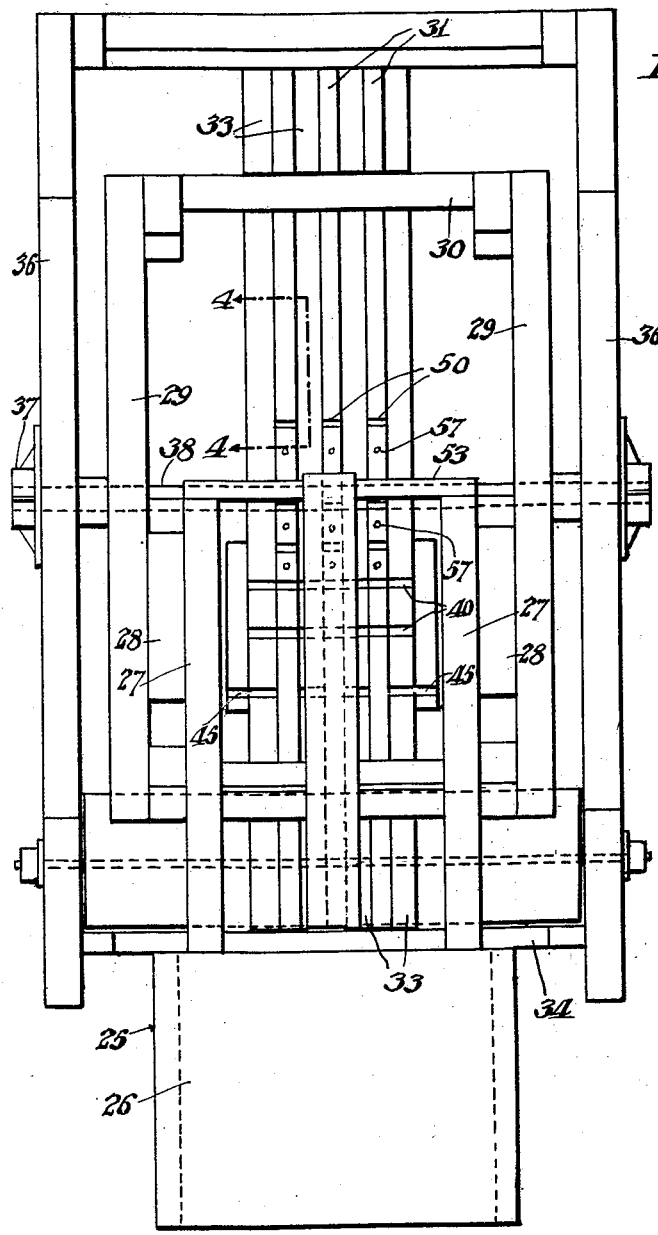
Fig. 3 is a front end view of the machine.
Figure 4:
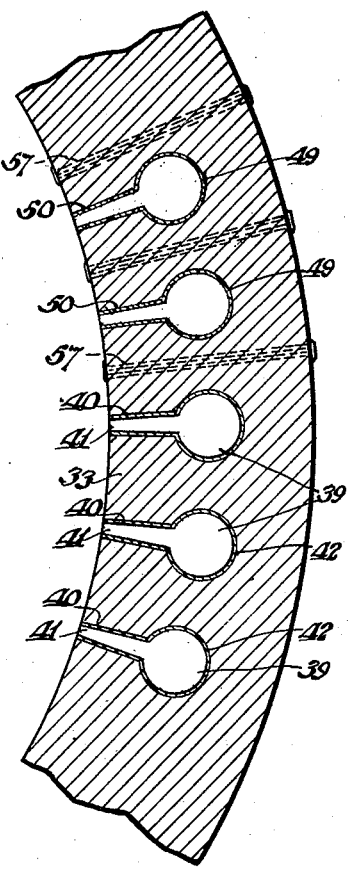
Fig. 4 is an enlarged fragmentary sectional view of a slide in a plane suggested by the line 4—4 of Fig. 3 and showing in dotted lines some of the warp thread bores through an adjacent guide.

Figs. 13 to 21, inclusive, are diagrammatic views of the several threads in their various positions during a cycle of operations of the machine.

In carrying out my invention as herein embodied, 25 represents a suitable machine frame which, for purposes of illustration only, includes a base 26, uprights 27 and a superstructure consisting of two side pieces 28.

On the side pieces are mounted stanchions 29 and between said stanchions and supported thereby at their upper and lower ends are pairs of rails 30 to which are permanently and rigidly secured the stationary arcuate guides or warp thread carriers 31 by keys 32 fixed in said guides and projecting into the space between each pair of rails 30.

Arcuate slides or spool carriers 33 move in an arc corresponding to the curvature of the guides 31 and the ends of said slides are secured to head rails 34 arranged in spaced pairs and held in position by keys 35 fixed in the slides and projecting into the space between each pair of said head rails. These head rails 34 are fixed to the side arms 36 which function similar to the spokes of a wheel and have bearings 37 so as to freely rotate on suitable axes, such as the ends of the axle 38.

Each slide 33 has a plurality of transverse openings 39 running completely through from side face to side face and regularly spaced around each slide with the associated openings in all slides in endwise alignment. From each opening 39 leads a slot 40 to the concave edge of the respective slide to receive the hollow beaks 41, of the spool cases 42 mounted to move back and forth, in and out of, and through the openings 39. Each spool case, except the right hand end one in the bottom row, as shown in Figs. 3 and 6, carries a spool 42' with thread thereon.

In addition, again referring to Figs. 3 and 6, the outermost or side slides carry what I term magazines 43, the latter being formed with or attached to said side slides to provide a unitary structure. Said magazines have chambers 44 and slots 45 similar in shape to the openings 39 and slots 40 and since three rows and three groups of both warp and spool threads are shown, merely for purposes of illustration, the lowest chambers 44 are depicted as longer than the higher ones on each side.

Pushers or plungers 46 and 46a are slidably mounted in the magazines and project into the chambers, the pushers 46a entering the lowest and longer chambers for contact with either spool cases or spacers to be presently described. Said pushers 46a have two movements, or a two step movement and therefore are shown as having stops 47 which may engage wall faces of the magazine or enter ways 48.

The guides 31 are also provided with openings 49 and slots 50 identical in shape to similar apertures in the slides through which the spool cases 42 pass, as well as the spacers 51 which, when the slides are being rotated, rest in the openings 49. Under certain conditions the spacers also enter the magazine chambers and, as will be more fully described below, said spacers move back and forth in the openings and change their positions relative to the spool cases or spools.

For purposes of illustration I have shown three horizontal rows of spool cases or spools with three spools in each row and an empty or extra case or spool, functioning as a spacer, in the bottom row, see Fig. 6, where the right hand end case is the empty one. This provides nine spool threads a, b, c, d, e, f, g, h and i, Figs. 7, 8 and 13 to 21, inclusive, all extending radially to a slotted bar 52, thence over a shunt bar 53 and to a suitable tension or take-up device 54, such as an intermittently revolving roll. The slot in the bar 52 must be large enough to permit passage of a packing rod.

The warp threads r, s, t, u, v, w, x, y and z are also shown as nine in number for purposes of illustration and like the spool threads are arranged in three rows of three threads to the row. The warp threads are connected to a warp beam 55, then pass through a tailpiece 56, and then through separate holes 57 in the several stationary arcuate guides 31 from whence said threads project in radial lines to the slotted bar 52 and finally over the shunt bar 53 to the take-up device 54. Thus it will be obvious that the positions of the warp threads remain fixed.

As previously stated I have shown nine warp and nine spool threads each kind of threads arranged in three horizontal rows of three threads each for purposes of illustration only, because there may be more and possibly less. The warp threads of the different rows are always in vertical columns but the spool threads which are also in vertical column positions are changed in position from time to time during the operation of the machine.

In manipulating the machine to produce a fabric 58 similar to that shown in Fig. 2, the slides 33 are rotated counterclockwise, when looking at the machine as in Fig. 1, until they are in the lowermost position, as shown in Fig. 12, and all of the spools or spool cases and their spacers are moved upward or to the right as depicted in Figs. 5 and 6 respectively. This positions the entire group of spool threads entirely out of and below the field of warp threads and one step to the right so that one vertical column of said spool threads is beyond the respective vertical column of warp threads, as illustrated in Fig. 13. The slides 33, all of which move in unison, are then rotated clockwise until the group of spool threads a to i, inclusive, are positioned with the top row of spool threads above the top row of warp threads r, s and t and all other rows of spool threads are similarly distributed relative to the respective warp threads, as in Fig. 14. At this point the slides are held against movement by a suitable latch 59 slidably mounted in the machine frame and entering a preselected one of a number of apertures in the slide structures.

Next the pushers 46 and 46a in the upper portion of Fig. 5, are moved inward, said pushers 46 making the complete stroke but the pusher 46a, on the right hand side of Fig. 6, only makes a one-half stroke, it being arrested by its stop 47. Therefore all of the rows of spool threads are shifted one step to the left so that the left hand vertical column of spool threads is outside of the contiguous vertical column of warp threads and all other vertical columns of spool threads are similarly distributed relative to the respective warp thread columns, as in Fig. 15. The slides are again rotated clockwise to carry the group of spool threads above and out of the field of warp threads, as in Fig. 16, and said slides latched to hold them in this new position. The movements so far described with the paths of travel of the spool threads are shown in Fig. 8 and said spool threads have crossed the warp threads. The crossed threads are now packed by inserting a suitable packing instrumentality 60, Fig. 12, such as a packing rod, in the space between the upper row of warp threads and the lower row of spool threads, Fig. 16, and pulling said packing instrumentality towards the shunt bar 53 to cause a twisting of the threads and completing one set of stitches or loops in the production of the fabric 58.

After the above mentioned packing operation has been completed, the pusher 46a at the right hand side of the machine as in Fig. 6, is turned on its axis until its stop 47 can enter the aperture 48 when said right hand pusher 46a is moved the balance of its inward stroke. This will shift the lower row of spool threads $g$, $h$ and $i$ one step farther to the left which will position one spool thread two places outside of and to the left of the field of warp threads, as shown in Fig. 17. Next the slides are rotated counterclockwise until the group of spool threads are moved downward between the warp threads one step or until the shifted lower row of spool threads are below the upper row of warp threads, as in Fig. 18. The pusher 46a at the left hand side of the machine, as in Fig. 6, is now pushed inward one-half of its stroke or until arrested by its stop 47 engaging a wall of the machine, said pusher having been previously rotated axially. This returns the lower row of spool threads into columnar form with the other threads of the group as shown in Fig. 19 and joins or connects the several column groups of spool threads to the adjacent column groups of warp threads.

Next the slides are again rotated counterclockwise until the spool threads reach a position where the two lowermost rows of said spool threads are below the bottom row of warp threads, illustrated in Fig. 20. The left hand pusher 46a, as in Fig. 6, is now rotated axially to cause its stop to register with the adjacent aperture 48 and then moved inward the balance of its stroke, and the other pushers 46 at the bottom of Fig. 5, are moved in their complete strokes. This positions the group of spool threads so that the right hand column thereof is outside of the right hand column of the warp threads, as in Fig. 21. Thereafter the slides are again rotated counterclockwise until all of the spool threads are out of and below the field of warp threads, as in Fig. 13. The complete movement of the last half of the cycle and the paths of travel of the spool threads are depicted in Fig. 7. The spool threads have now been recrossed with the warp threads and the packing instrumentality is inserted in the space between the top row of spool threads and the lower row of warp threads and moved towards the shunt bar 53 to cause a further twisting of the threads and completing another set of stitches or loop of the fabric being produced. The cycle of operations is repeated until a desired length of fabric is made.

During the crossing of the threads, said threads assume the general positions illustrated in Fig. 9, where the vertical columns are made up of both spool and warp threads with one of the threads acting as a tie and extending from the top of one column of threads to the bottom of the adjacent column of threads. As the threads are packed these columns of threads are gradually turned until they assume an intermediate position shown in Fig. 10, and finally the complete horizontal position depicted in Fig. 11 which represents a cross section of the finished fabric.

It is to be understood that the thread spools, warp beam and take-up are all properly tensioned and may be intermittently actuated in proper sequence to feed out the threads and wind up the fabric and at the same time maintain said threads sufficiently taut to readily pass between and across one another without fouling.

While I have shown, for purposes of illustration, a machine for making one type of fabric, where the warp and spool threads are equal in number and, generally, one spool thread is twisted around two warp threads, it will be apparent that by merely changing the movements of the spool threads vertically and laterally said spool threads can be twisted around one or several warp threads in either direction.

Attention is also called to the fact that when the spools or spool cases are shifted laterally of the machine, one or more spacers 51 will enter a magazine chamber and in the lower row the empty spool case at the right hand end of Fig. 6, functioning as a spacer, under certain conditions, will enter the magazine chamber. Further, when the openings in one of the slides are occupied by spacers, the latter will be moved from one position to another in the arc of the slides and then shifted laterally so that said spacers circulate about the machine but the spools and their cases only move up and down in the arc of the slides, and therefore always remain in their proper respective rows.

Of course I do not wish to be limited to the exact details of construction herein shown and described as these may be varied within the scope of the appended claims without departing from the spirit of my invention.

Having described my invention what I claim as new and useful is:

1. In a netted fabric machine, means for holding a plurality of warp threads arranged in spaced horizontal rows and spaced vertical columns, means to hold a plurality of spool threads arranged in spaced horizontal rows and spaced vertical columns, said second named means being shiftable laterally for changing the positions of the spool threads relative to the warp threads, and means to move the spool thread holding means in a circular generally vertical direction for further changing the positions of the spool threads relative to said warp threads and moving all of the spool threads entirely out of the field of warp threads for packing purposes.

2. The netted fabric machine of claim 1, in combination with a bar to guide all of the threads in radial directions from their respective holding means.

3. In a netted fabric machine, a plurality of stationary laterally spaced arcuate guides each having several equally spaced transverse openings with slots leading from the said openings to the concave faces of the guides, said guides having holes from back to front for the passage of warp threads, a plurality of arcuate slides between the guides and movable in unison in a circular path, said slides each having several equally spaced transverse openings with slots leading from the said openings to the concave faces of the slides corresponding to the openings and slots in the guides, spools in the openings in the slides to be transported in circular paths to preselected positions as said slides are moved and carrying spool threads which pass through the slots and adapted to be shifted laterally through the openings in the slides and guides which are in alignment to preselectively transfer the spools from slides which they occupy to others of said slides, and spacers between the spools to rest in the openings in the guides to maintain the spools in the slides when the latter are to be moved and transfer lateral movement from one spool to another.

4. The netted fabric machine of claim 3, in combination with pushers to move each row of spools and spacers.

5. The netted fabric machine of claim 3, in combination with magazines at the sides of the outermost slides and having chambers to temporarily receive the end spacers when the end spools are in the outermost slides and transport said spacers to other predetermined rows of spools and spacers for the purpose of keeping spacers in proper relation to the spools.

6. In a netted fabric machine, a plurality of stationary arcuate guides having openings to normally hold spacers, and a plurality of arcuate slides associated with the guides and movable in circular paths, said slides having openings to normally hold spools, said spools and spacers being movable in and out of their respective openings and through all of them when said openings are in alignment.

7. The structure in claim 6, in combination with means to independently move each row of spools and spacers.

8. The structure in claim 6, in combination with magazines at the sides of the outermost slides and having chambers in alignment with the slide openings to receive and temporarily hold the end spacers.

9. A netted fabric machine comprising a frame, a plurality of stationary arcuate guides mounted on the frame and having transverse openings to normally hold spacers and also provided with slots communicating with said openings and the concave faces of the guides and further having holes from back to front through which warp threads pass, a plurality of arcuate slides alternating with the guides and movable in circular paths, said slides having transverse openings to normally hold spools adapted to contain spool thread and also provided with slots communicating with said last named openings and the concave faces of the slides, the spool threads from the spools passing through the slots, spools and spacers arranged in alternate order in rows in the openings and adapted to be shifted laterally to transfer the spools from one to another of the slides to change the positions of the spool threads relative to the warp threads in horizontal lines in any preselected order, the movements of the slides changing the positions of the spool threads relative to the warp threads in generally vertical lines any predesired distance and finally carrying all of said spool threads entirely out of the field of the warp threads to a packing position, and pushers to impart a lateral movement to the rows of spools and spacers.

10. The machine of claim 9, in combination with spool cases enclosing the spools, and hollow beaks projecting from the cases into the slots and through which the spool threads run.

11. In a netted fabric machine, means for holding a group of warp threads arranged in spaced horizontal rows and spaced vertical columns, means to hold a group of spool threads arranged in spaced horizontal rows and spaced vertical columns, one of said holding means being shiftable laterally for changing the position of one group of threads relative to the other group, and means to move the laterally shiftable holding means vertically for further changing the position of said one group of threads relative to the other group of threads and moving all of the threads of said one group of threads entirely out of the field of the other group of threads for packing purposes.

WILFRID M. BOULAIS.